United States Patent Office 3,118,930
Patented Jan. 21, 1964

3,118,930
PROCESS FOR THE PREPARATION OF
γ-OXOSENECIOIC ACID ESTERS
Keiiti Sisido, Sakyoku, Kyoto, Hitosi Nozaki, Wakegun, and Minoru Tuda, Kamikyoku, Kyoto, Japan, assignors to Chugai Seiyaku Kabushiki Kaisha, Chuo-ku, Tokyo, Japan, a corporation of Japan
No Drawing. Filed Aug. 25, 1959, Ser. No. 835,852
4 Claims. (Cl. 260—471)

This invention relates to a process for the preparation of γ-oxosenecioic acid esters from γ-bromosenecioic acid esters with commercial advantages.

The γ-oxosenecioic acid esters according to the invention are useful as intermediates for the synthesis of vitamin A, carotene and others and also useful as a perfume or flavoring agent for foodstuffs on account of its specific fragrance.

Previously known process for the preparation of γ-oxosenecioic acid esters consists in oxidizing γ-hydroxysenecioic acid esters with activated manganese dioxide to give the end product. However, such process suffers from the disadvantages that the starting material, γ-hydroxysenecioic acid esters and the oxidizing agent, activated manganese dioxide, are not easily available and that the end product of high purity cannot be obtained. Accordingly this process is not commercially advantageous.

As a result of our many investigations on the processes by which γ-oxosenecioic acid esters can be advantageously prepared in high purity, we have found that γ-oxosenecioic acid esters (IV) may be prepared by treating γ-bromosenecioic acid esters (I) with pyridine to form the pyridinium salt (II), converting the resulting salt into the nitrone by treating it with an alcoholic solution of p-nitrosodialkylaniline, for example, p-nitrosodimethylaniline in the presence of an alkali hydroxide and hydrolyzing the nitrone in the presence of an acid.

The process of the invention is shown below with chemical equations:

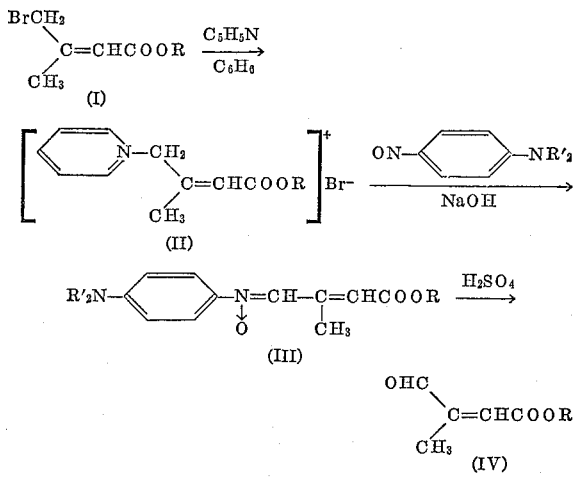

wherein R stands for a saturated or unsaturated aliphatic or aromatic group of up to 8 carbon atoms and R' stands for a lower alkyl group.

The γ-oxosenecioic acid esters prepared according to the invention are of higher purity than those produced by the conventional process.

The process of the invention allows a higher yield of the product than the hitherto known processes. Furthermore the starting γ-bromosenecioic acid esters may be readily prepared by treating senecioic acid esters with bromine or N-bromosuccinimide.

The esters referred to in the process of the present invention include saturated and unsaturated lower aliphatic and aromatic esters, such as, for example, methyl, ethyl, amyl, octyl, allyl, phenyl, and benzyl esters, etc.

Example 20.7 grams (0.1 mole) of ethyl γ-bromosenecioate was dissolved in an amount of benzene. To the resulting solution, a solution of 8 grams (0.1 mole) of anhydrous pyridine in benzene was slowly and dropwise added under stirring with ice-cooling. After completion of the addition, the mixture was heated under reflux for 60 minutes. The solution became red and separated into two layers. After being allowed to cool, the upper layer was decanted and the lower layer of red liquid was washed with benzene. The lower layer of red liquid was covered with a small amount of alcohol and added with an alcoholic solution of 15.0 grams (0.1 mole) of p-nitrosodimethylaniline under ice-cooling. When 100 cc. of 1 N sodium hydroxide solution was slowly and dropwise added under stirring and the stirring was further continued for about 30 minutes, red-colored crystals separated. This crystalline product was the nitrone of M.P. 90° C. (after recrystallization from benzene-ethyl acetate). This substance is a novel compound. This nitrone was recovered by filtration and suspended in 200 cc. of ether. 150 cc. of 6 N sulfuric acid were slowly added to the suspension with ice-cooling and then stirred for a while. The ethereal layer was subsequently removed and combined with the liquid which had been obtained by extracting the remaining aqueous layer with ether. The combined solution was washed successively with a saturated solution of sodium bicarbonate and water and dried over anhydrous sodium sulfate. After the drying, the ether was distilled off. Distillation of the residue under reduced pressure in nitrogen gas gave 7.7 grams of ethyl γ-oxosenecioate of B.P. 51–53° C./4.5 mm. Hg and $n_D^{20}$ 1.4597. Yield amounted to 54% on the basis of ethyl γ-bromosenecioate.

Ethyl γ-oxosenecioate could be similarly prepared even when the paste-like nitrone was subjected to hydrolysis, which was obtained by adding an amount of water to the mother liquor in which the nitrone had been formed, without taking out the nitrone in the form of crystals.

The ethyl γ-oxosenecioate obtained by this process was a yellow-colored liquid having a flavor of watermelon. Values of elementary analysis of it corresponded to the calculated values. The infrared spectra of it showed absorptions at 2840 cm.$^{-1}$, 2720 cm.$^{-1}$, 1705 cm.$^{-1}$ due to the aldehyde bond and at 1730 cm.$^{-1}$ due to the ester bond and at 1645 cm.$^{-1}$ due to the double bond between carbon atoms.

Semicarbazone and 2,4-dinitrophenylhydrazone of this product had melting points of 208° C. and 200° C., respectively.

The process of the present invention can be applied on various esters in a similar manner to the previous example. Results obtained are listed in the following table, together with some properties of the products.

| γ-oxosenecioate | B.P., °C./mm. Hg | $n_D^{20}$ | Yield, percent | Molecular formula | Calculated values | | Found values | |
|---|---|---|---|---|---|---|---|---|
| | | | | | C, percent | H, percent | C, percent | H, percent |
| Methyl | 56–57/7 | 1.4645 | 48 | $C_6H_8O_3$ | 56.24 | 6.29 | 56.18 | 6.53 |
| Ethyl | 51–53/4.5 | 1.4597 | 54 | $C_7H_{10}O_3$ | 59.14 | 7.09 | 58.83 | 7.22 |
| n-Propyl | 62.5–63/4.7 | 1.4600 | 35 | $C_8H_{12}O_3$ | 61.52 | 7.75 | 60.03 | 7.33 |
| n-Butyl | 83–84/6 | 1.4589 | 46 | $C_9H_{14}O_3$ | 63.51 | 8.29 | 62.54 | 8.27 |
| iso-Amyl | 82–84/4.7 | 1.4609 | 45 | $C_{10}H_{16}O_3$ | 65.19 | 8.75 | 64.80 | 8.49 |

In the table, the yields were calculated on the basis of the γ-bromosenecioate used.

What we claim is:

1. A compound of the formula

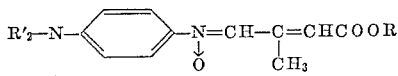

where R and R′ are each a lower alkyl group.

2. The process of preparing a nitrone which comprises preparing a solution by dissolving one mole of a lower alkyl γ-bromosenecioate in benzene, mixing one mole of anhydrous pyridine with the resulting solution while stirring and cooling, heating the resultant mixture under reflux conditions until the mixture becomes red and forms an upper layer and a lower layer, cooling the mixture, separately treating the lower layer by adding thereto one mole of p-nitrosodimethylaniline in an alcohol solution under cooling conditions, adding to the above-treated lower layer a sodium hydroxide solution while stirring until a crystalline product separates out, and recovering the crystalline product.

3. A process as set forth in claim 2 including the additional steps of suspending the crystalline product in ether, adding to the suspension sulfuric acid while stirring and cooling, removing an ether layer from the acidified suspension, and distilling the ether from the ether layer to remove a residue.

4. The process of claim 3 wherein the alkyl γ-bromosenecioate is ethyl γ-bromosenecioate.

References Cited in the file of this patent

Beilstein, volume 3, second supp., page 460 (1942).